(12) United States Patent
Wilson et al.

(10) Patent No.: US 7,009,506 B2
(45) Date of Patent: Mar. 7, 2006

(54) ELECTRONIC MONITORING DEVICE AND PATCH ASSEMBLY

(75) Inventors: Paul B. Wilson, Tallmadge, OH (US); John D. Rensel, Tallmadge, OH (US); Russell W. Koch, Hartville, OH (US)

(73) Assignee: Bridgestone Firestone North American Tire, LLC, Nashville, TN (US)

( * ) Notice: Subject to any disclaimer, the term of this patent is extended or adjusted under 35 U.S.C. 154(b) by 543 days.

(21) Appl. No.: 10/192,567

(22) Filed: Jul. 9, 2002

(65) Prior Publication Data

US 2002/0174925 A1 Nov. 28, 2002

Related U.S. Application Data

(60) Continuation-in-part of application No. 09/976,076, filed on Oct. 12, 2001, now Pat. No. 6,860,303, which is a division of application No. 09/455,977, filed on Dec. 6, 1999, now Pat. No. 6,386,251, which is a continuation of application No. 09/021,518, filed on Feb. 10, 1998, now Pat. No. 6,030,478.

(51) Int. Cl.
*B60C 23/00* (2006.01)

(52) U.S. Cl. .............. 340/445; 340/582.2; 340/693.12; 152/152.1

(58) Field of Classification Search ................. 340/442, 340/445, 447, 448, 693.9, 693.12, 572.8; 152/152.1
See application file for complete search history.

(56) References Cited

U.S. PATENT DOCUMENTS

| | | | |
|---|---|---|---|
| 4,067,235 A | | 1/1978 | Markland et al. |
| 4,488,706 A | * | 12/1984 | Kono .......................... 254/131 |
| 4,843,792 A | * | 7/1989 | Rogers et al. ............. 52/127.7 |
| 5,500,065 A | * | 3/1996 | Koch et al. .................. 156/123 |
| 5,781,112 A | * | 7/1998 | Shymko et al. ............ 340/10.3 |
| 5,880,675 A | * | 3/1999 | Trautner ................... 340/572.8 |
| 6,025,777 A | | 2/2000 | Fuller et al. |
| 6,030,478 A | * | 2/2000 | Koch et al. .................. 156/123 |
| 6,082,192 A | | 7/2000 | Koch et al. |
| 6,191,691 B1 | * | 2/2001 | Serrault ................... 340/572.8 |
| 6,217,683 B1 | | 4/2001 | Balzer et al. |
| 6,292,095 B1 | | 9/2001 | Fuller et al. |
| 6,360,594 B1 | | 3/2002 | Koch et al. |
| 6,386,251 B1 | * | 5/2002 | Koch et al. .............. 152/152.1 |
| 6,452,497 B1 | * | 9/2002 | Finlayson ................ 340/572.8 |
| 6,486,771 B1 | | 11/2002 | Fuller et al. |
| 6,657,542 B1 | * | 12/2003 | Usami ...................... 340/572.8 |
| 6,860,303 B1 | * | 3/2005 | Rensel et al. ............. 152/152.1 |

FOREIGN PATENT DOCUMENTS

DE  297 20 612 U1  3/1998

(Continued)

*Primary Examiner*—Benjamin C. Lee
(74) *Attorney, Agent, or Firm*—Fred H. Zollinger, III

(57) ABSTRACT

A monitoring device and patch assembly includes a patch that removably and re-attachably holds the monitoring device. The patch is adapted to connect the monitoring device to a pneumatic tire when the monitoring device is held by the patch. The patch is configured to hold a monitoring device having a rounded outer surface. The patch holds the rounded monitoring device by having a resilient tube with an outlet having a diameter smaller than the diameter of the monitoring device. The monitoring device of the invention includes a feature that allows it to be removed from the patch.

16 Claims, 12 Drawing Sheets

FOREIGN PATENT DOCUMENTS

| | | |
|---|---|---|
| EP | 0 660 639 A1 | 6/1995 |
| EP | 0 936 089 A2 | 8/1999 |
| EP | 1 000 776 A2 | 5/2000 |
| GB | 1 455 656 | 11/1976 |
| WO | WO 00/07834 | 2/2000 |
| WO | WO 00/08598 | 2/2000 |

\* cited by examiner

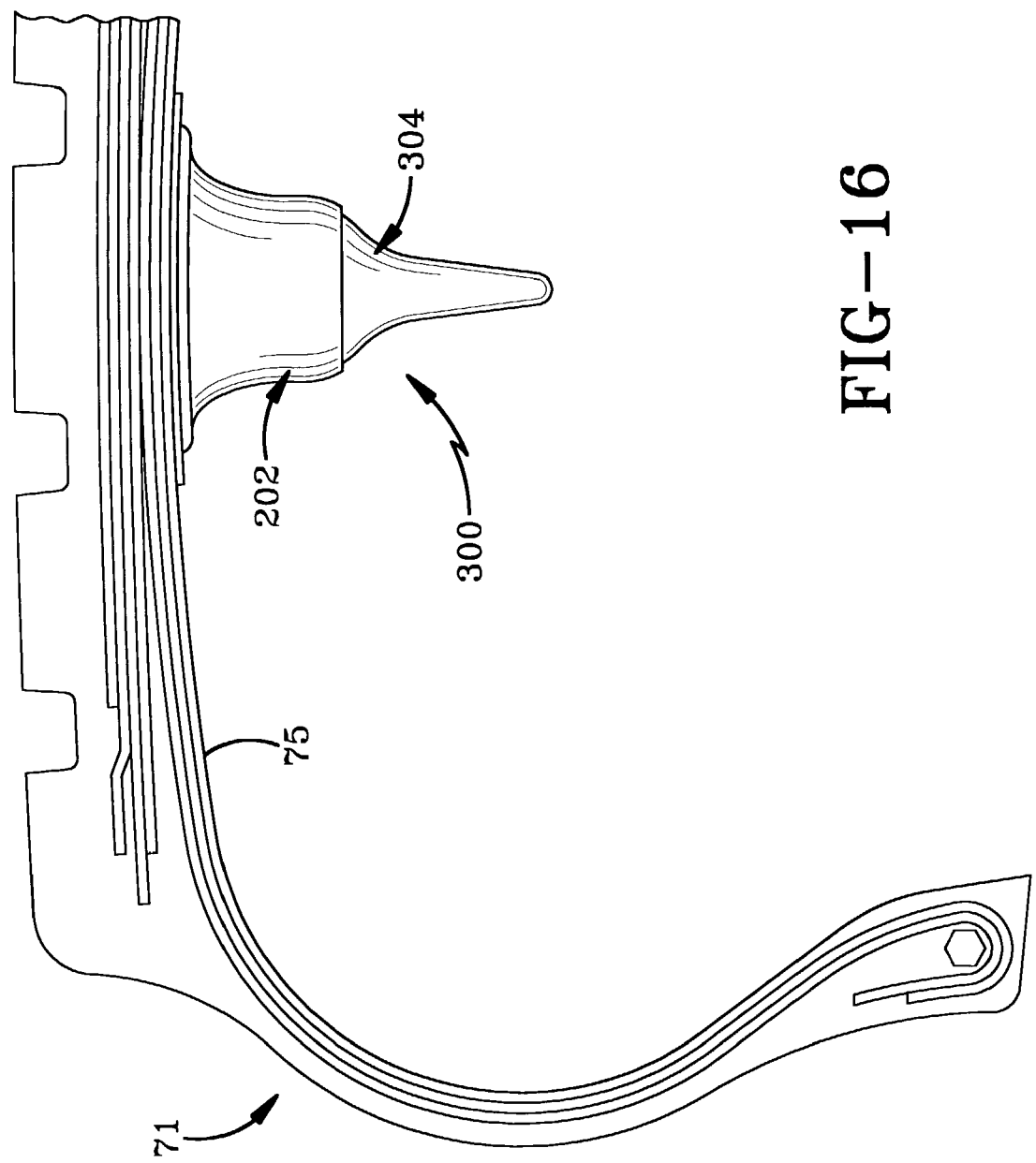

ELECTRONIC MONITORING DEVICE AND PATCH ASSEMBLY

CROSS REFERENCE TO RELATED APPLICATIONS

This application is a continuation-in-part application application claiming priority from U.S. patent application Ser. No. 09/976,076 filed Oct. 12, 2001 now U.S. Pat. No. 6,860,303 which is a divisional of Ser. No. 09/455,977 filed Dec. 6, 1999 U.S. Pat. No. 6,386,251 issued May 14, 2002, which is a continuation application claiming priority from Ser. No. 09/021,518 filed Feb. 10, 1998 U.S. Pat. No. 6,030,478 issued Feb. 29, 2000; the disclosures of each are incorporated herein by reference.

BACKGROUND OF THE INVENTION

1. Technical Field

The invention generally relates to mounting arrangements for electronic monitoring devices and, more particularly, to an electronic monitoring device and patch assembly wherein the electronic monitoring device is removably attached to the patch so that the electronic monitoring device may be repeatedly removed from and reattached to the patch. Specifically, the present invention relates to a patch that removably and re-attachably holds an electronic monitoring device having a rounded body.

2. Background Information

Monitoring the engineering conditions of tires is becoming more and more desirable in the art. The monitored engineering conditions include internal pressure and internal temperature and other conditions that are useful for improving tire efficiency in the field. Monitoring tire conditions on large off-the-road equipment has become especially desirable given the costs of the tires.

Prior art methods of monitoring large truck tires have included passive integrated circuits embedded in the body of the tire, or self-powered circuits which are positioned external to the tire. The passive integrated circuits rely on inductive magnetic coupling or capacitative coupling to energize the circuit, thus providing power to the circuit from a source remote from the tire. Self-powered circuits positioned external to the tire are exposed to damage from the environment such as weather, road hazards and even vandalism.

Recent engineering advances have permitted the installation of monitoring devices having active integrated circuits within tires. One such device is described in U.S. Pat. No. 5,562,787 to Koch et al. entitled Method of Monitoring Conditions of Vehicle Tires, incorporated herein by reference, and assigned to the assignee of the present invention. These devices include an active circuit powered by a dedicated long life, miniature battery and at least one sensor for detecting, optionally storing and transmitting real time engineering conditions within the tire. Such devices are capable of being programmed to remain in an active, but dormant condition, but will switch automatically to an "awakened" condition in response to an external signal or a condition which exceeds preset limits.

These devices have been mounted to the tires in some prior art situations. Other systems have placed the monitoring device loosely inside the tire so that the monitoring device could roll freely within the tire while performing its monitoring functions. An example of this type of device is explained in U.S. Pat. No. 6,082,192. Although these "loose" devices have been accepted for use in some tires and in some situations, other tires and other situations are believed to perform better when the monitoring device is fixed to the tire. In these situations, a mount is desired that can be used to mount a "loose" monitoring device—such as the monitoring device having the rounded body of U.S. Pat. No. 6,082,192—into a tire.

BRIEF SUMMARY OF THE INVENTION

The invention provides a monitoring device and patch assembly wherein the patch is configured to removably and re-attachably hold a monitoring device having a body that is outwardly curved. In one embodiment of the invention, the patch includes a tube that removably and re-attachably receives the monitoring device.

The invention also provides a monitoring device that has a feature that allows the monitoring device to be removed from the patch. In one embodiment, the feature is an opening in the body of the monitoring device that allows a hook to be connected to the body to extract the monitoring device from the patch.

The invention also provides a monitoring device and patch combination that positions the monitoring device in a predictable orientation with respect to the tire so that the antenna of the monitoring device may be tuned for the orientation. The invention provides embodiments wherein the antenna is encapsulated and freely extending.

The invention also provides an embodiment having a teardrop shaped monitoring device that is attached to a patch. The antenna of the monitoring device may extend into the tail portion of the teardrop. The teardrop shaped monitoring device may also be removably and re-attachably connected to the patch.

BRIEF DESCRIPTION OF THE SEVERAL VIEWS OF THE DRAWINGS

FIG. 16 is a section view of a pneumatic tire with a seventh embodiment of the invention mounted to the crown portion of the tire.

Similar numbers refer to similar parts throughout the specification.

DETAILED DESCRIPTION OF THE INVENTION

Embodiments of the present invention will be described below with reference to the drawings.

Figure 1:
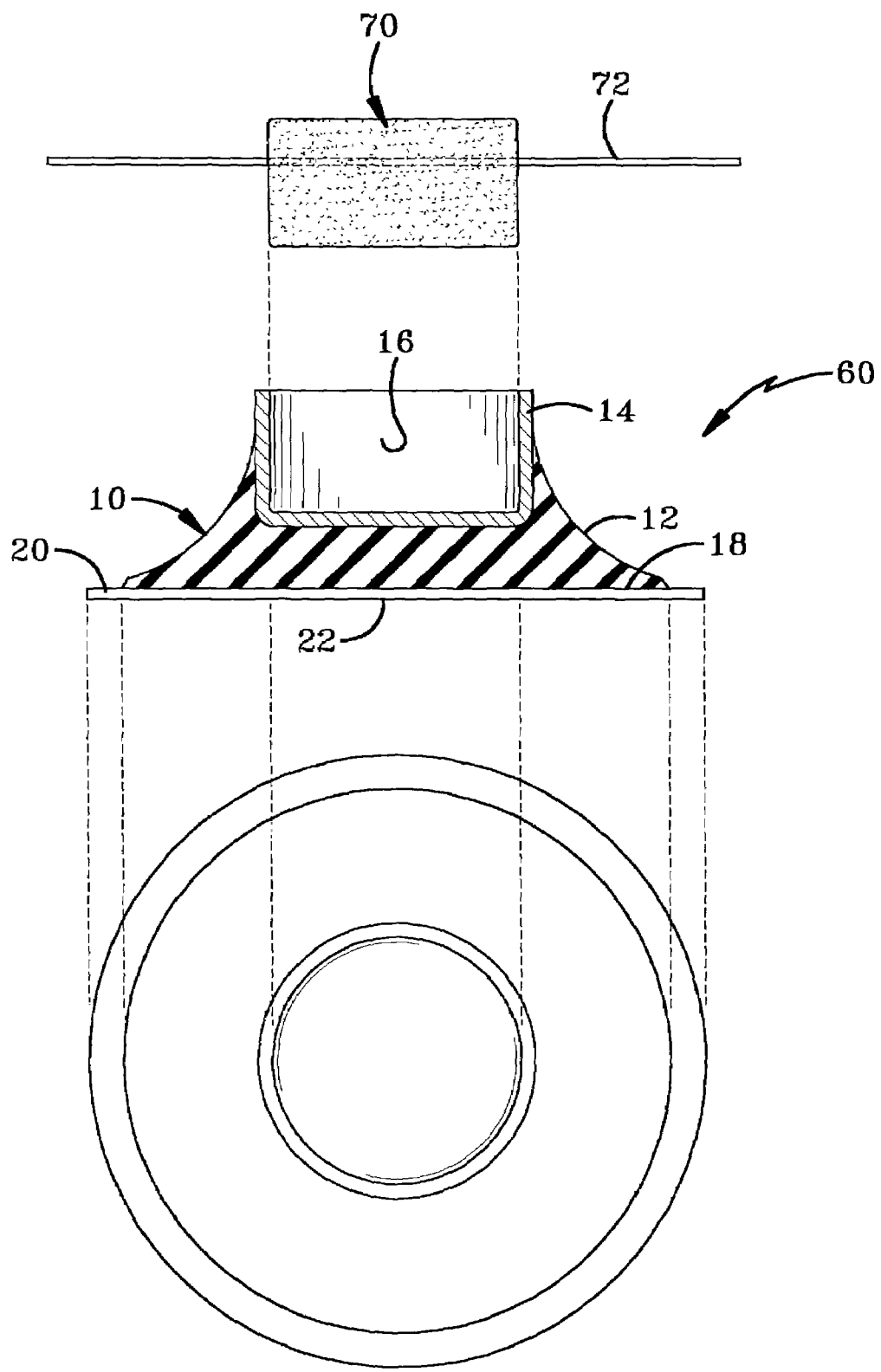
FIG. 1 is an exploded cross-sectional view of the first embodiment of the patch of the invention showing the housing and cavity for the tag assembly.

FIG. 1 shows a rubber patch 10 of the present invention. The patch 10 has a first side 12 which includes a housing 14 with a cavity 16 of a preselected configuration. As shown in FIG. 1, the housing 14 has a cavity 16 which is cylindrical, although the cavity 16 may be of any convenient configuration, as will become apparent from the description which follows. The patch has a second opposite side 18 approximating the contour of an innerliner of a tire (not shown). In a preferred embodiment, the rubber patch is vulcanized and then assembled to the vulcanized tire. Although any method for assembling the vulcanized rubber patch to the vulcanized tire, one acceptable and preferred method is set forth in U.S. Pat. No. 5,971,046; the disclosures of which are incorporated herein by reference. In accordance with the referenced application, the patch may be a rubber selected from the group consisting of Ethylene Propylene Diene Monomer (EPDM) rubber, butyl rubber, natural rubber, neoprene and mixtures thereof. One preferred embodiment is a mixture of chlorobutyl rubber and natural rubber. Another preferred embodiment is a mixture of Styrene-Butadiene rubber (SBR) and natural rubber. Typically, patches made of these rubber compositions may be cured by heating to a temperature of about 150° C. and holding at this temperature for about 30 minutes. The time and temperature may be modified as necessary to achieve sufficient curing of the patch for further assembly. The second side 18 of the patch 10 approximates the contour of an innerliner of a tire. The contour of the second side 18 preferably is radiused to have about the same radius as the tire to which it is assembled, the radius being larger for larger tires. For very large tires, such as for off-the-road tires, the radius may be eliminated altogether, so that there is no contour and the opposite side is flat, having no contour.

Affixed to the second side 18 of the vulcanized tire patch is a dual cure bonding layer 20, which has a first side (not shown) and a second side 22. This dual cure bonding layer may be assembled to the patch at any time following vulcanization of the patch and prior to assembly of the patch assembly to the tire innerliner. The dual cure bonding layer is permanently assembled to the patch to form patch assembly 60. A non-curing cement (not shown) is applied to side 18 of the patch in order to hold the dual cure bonding layer 20 onto the patch. Exemplary non-curing cement and an exemplary dual cure bonding layer are products of Patch Rubber Company. The important feature of the dual cure bonding layer is that it can be chemically activated and cured, without the need for heating to an elevated temperature. The process is diffusion controlled, however, and some minimal heating will speed the curing process. The dual cure bonding layer may be any material which can be activated and cured to the vulcanized rubber of the tire innerliner and the vulcanized patch. Preferably, however, the dual cure bonding rubber is natural rubber. The dual cure bonding rubber, after application of the activating cement, may cure at room temperature over a period of seventy-two (72) hours. However, if more rapid curing is desired, this may be accomplished by heating to 45° C. for at least twenty-four hours.

Figure 2:
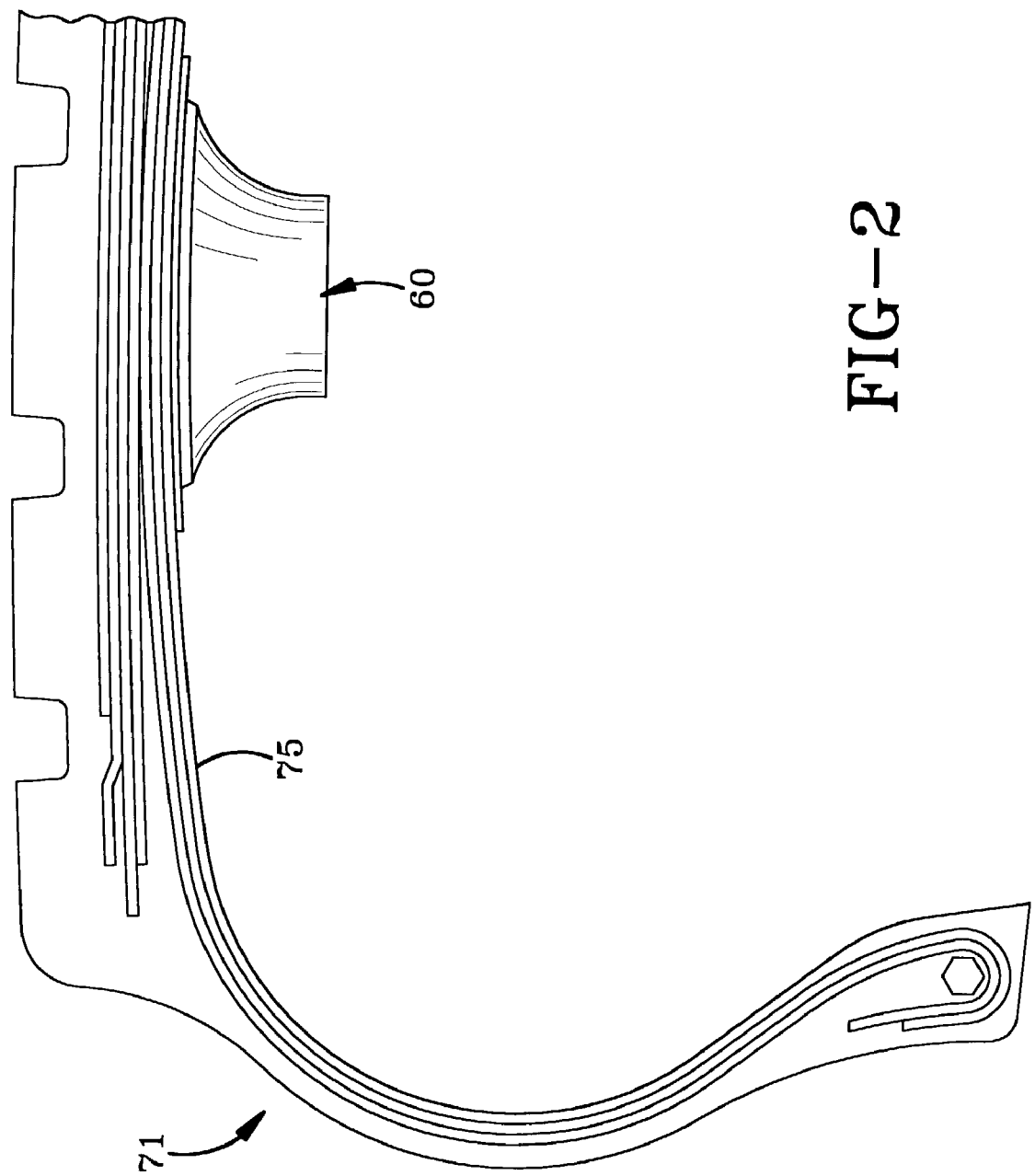
FIG. 2 is a cross-sectional view of the patch of the present invention attached to the innerliner of a tire.

Referring now to FIG. 2, patch assembly 60 is then assembled to the innerliner 75 of tire 71. Activating cement is first applied to second side 22 of dual cure bonding layer 20. The patch assembly is then stitched to the innerliner of the vulcanized tire and the patch assembly/tire assembly is allowed to cure for a sufficient time and temperature to form a strong bond between the tire and the patch assembly. The times and temperatures utilized for this curing may be basically the same times and temperatures as previously discussed. To ensure a strong bond, the patch assembly optionally may be clamped to the tire innerliner 75, until the curing cycle is completed.

Figure 3:
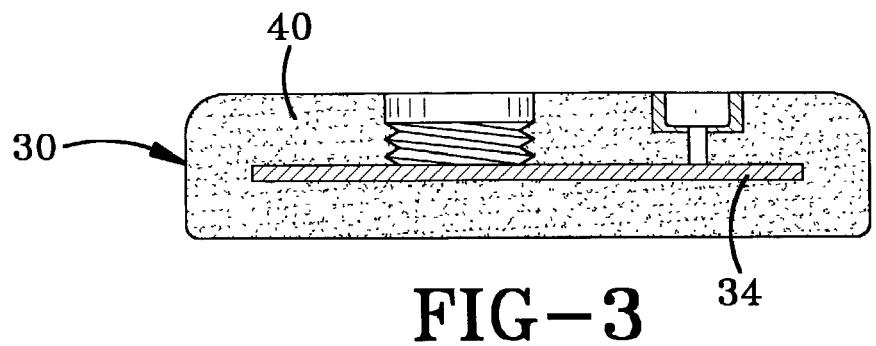
FIG. 3 is a cross-sectional view of the electronic monitoring device embedded in potting material.
Figure 4:
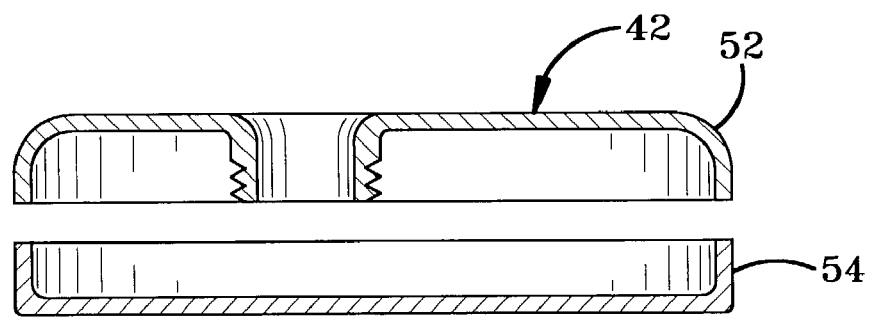
FIG. 4 is a cross-sectional view of the mold used to embed the electronic monitoring device in the potting material.
Figure 5:
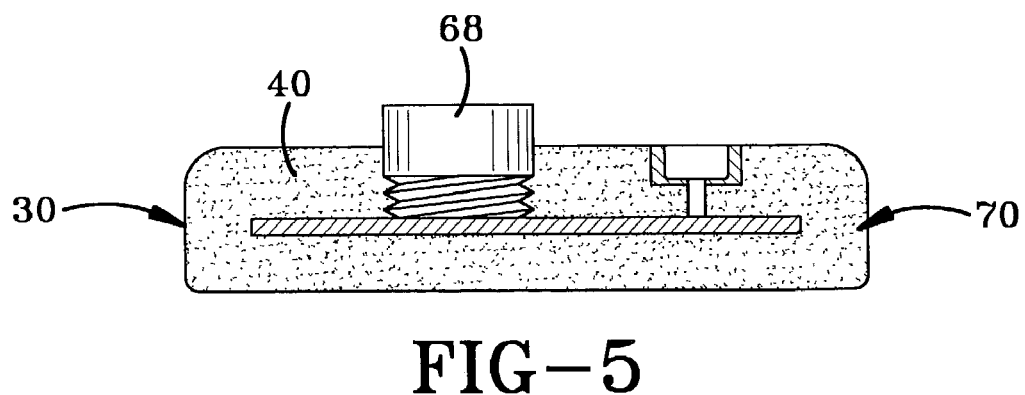
FIG. 5 is a cross-sectional view showing a battery attached to the tag; forming a tag assembly.

The electronic monitoring device is a circuit board which includes sensors and may include an antenna. The electronic monitoring device may include a power source or battery, although the battery may be attached to the electronic monitoring device at a later time. In the preferred embodiment, the battery is not included as part of the electronic monitoring device. The electronic monitoring device 34 is encapsulated in a potting material 40 which solidifies into a rigid material as shown in FIG. 3. Referring to FIGS. 3 and 4, the electronic monitoring device 34 is placed within a mold 42 having a first half 52 and a second half 54. The mold is then filled with the potting material 40 in fluid form, which fills the mold and flows around the electronic monitoring device and allowed to cure, resulting in a rigid tag. Any potting material having a Young's Modulus of at least 30,000 psi and which is capable of being molded around the electronic monitoring device without damaging any of the components of the device. Preferably, the potting material has a Young's Modulus of at least about 100,000 psi. Two preferred potting materials include epoxy and urethane. If desired, the curing of the potting material around the electronic device may be accelerated by preheating the mold to an elevated temperature which is above ambient, but below the temperature at which damage to the electronic monitoring device will occur. A preferred temperature is about 80° C. After the epoxy has been cured, the mold halves 52, 54 are separated, yielding a rigid, encapsulated tag 30. In a preferred embodiment, FIG. 5, a battery 68 which provides power to the tag 30 is attached to the tag to form a tag assembly 70. Although the battery is shown as held in position contacting the electronic monitoring device 34 by threading, any suitable means of attaching the battery to the circuit board so that the battery may be removed is acceptable. Alternate means of attaching the battery to the circuit board may include spring clips, lock pins or other hold down devices.

Figure 6:
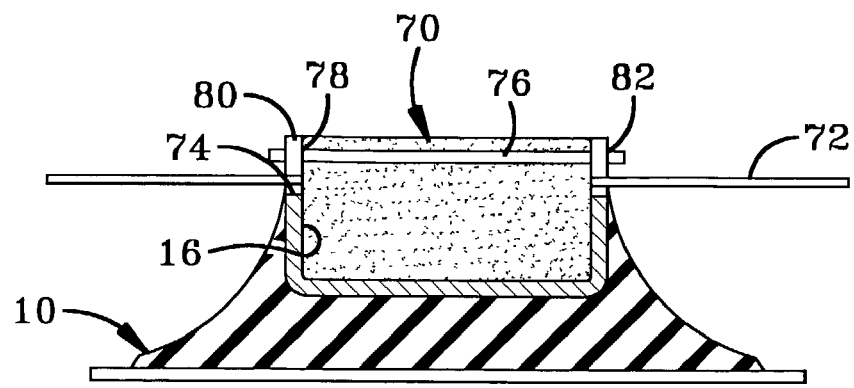
FIG. 6 is a cross-sectional view of the tag assembly assembled inside the cavity of the tire patch, with a locking device holding the tag assembly in place, before crimping of the locking device.

The tag assembly 70 may be of any configuration which allows it to fit within the contour of the cavity 16, both of which are cylindrical in the embodiment shown in FIG. 1. In the preferred embodiment, tag assembly 70 is assembled into the cavity 16 as shown in FIG. 6. Since the rubber patch assembly can be attached to the tire using an air cure or low temperature cure, it is understood that the sequence of assembling the tag assembly into the rubber patch housing may be accomplished either before or after the rubber patch is attached to the tire innerliner. Tag assembly includes an optional antenna 72. Housing 14 includes slots 74 to receive the antenna. After the tag assembly 70 is in place within the cavity, at least one lock pin 76 is inserted through a first aperture 78 in housing 80. As shown in FIG. 6, lock pin 76 is positioned across at least a portion of the top of tag assembly 70, preferably through a second aperture 82 on the opposite side of the housing. Alternatively, lock pin 76 could extend into the potting of tag assembly 70.

The positioning of the lock pin is not critical, so long as lock pin 78 positively secures tag assembly 70 into position within cavity 16 and prevents tag assembly 70 from moving. After insertion through the housing 14, the lock pin 76 is deformed so that it will not back out of the apertures. Tag assembly 70 may then be removed from the housing by simply drilling lock pin 76 out of aperture 78.

Many different methods of positively locking the tag assembly can be accomplished. By way of illustration of equivalent locking techniques, instead of a locking pin, a self-tapping screw may be inserted through aperture 78 and screwed into position within the potting.

Figure 7:
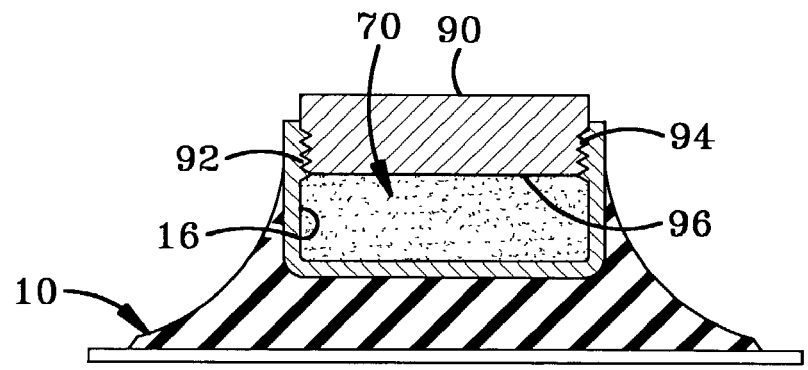
FIG. 7 is a second embodiment of the present invention depicting a cross-sectional view of the tag assembly being locked inside the cavity of the tire patch with a threaded insert.

In a second embodiment of the present invention, illustrated in FIG. 7, tag assembly 70 has a profile corresponding to that of cavity 16. Tag assembly is assembled into the bottom of cavity 16. Housing 14 extends above tag assembly 70 after it has been assembled into cavity 16. Insert 90, also having a profile corresponding to cavity 16 is the inserted into the housing until the bottom 96 of insert 90 contacts the top of tag assembly 70, thus securing it in place. Insert 90 is then locked in place. This may be accomplished by any convenient method, such as by extending a locking pin through insert 90 and deforming it, or by utilizing locking tabs to secure insert 90 to patch assembly 10. However, in the preferred embodiment shown in FIG. 7, insert 90 includes external threads 94 which correspond to internal threads 92 formed in housing 14. Insert 90 is screwed into housing 14 until the insert bottom 96 contacts the top of tag assembly 70. Of course, regardless of the method used to secure tag assembly 70 in place in cavity 16, tag assembly is readily removable for battery replacement or replacement of the entire assembly 70 by removing insert 90 from housing 14. It is obvious that tag assembly 70 may be reinserted after accomplishing repair or replacement, or after retreading of the tire by simply replacing insert 90 over the reassembled tag assembly and locking insert 90 in place as discussed above.

Figure 8:
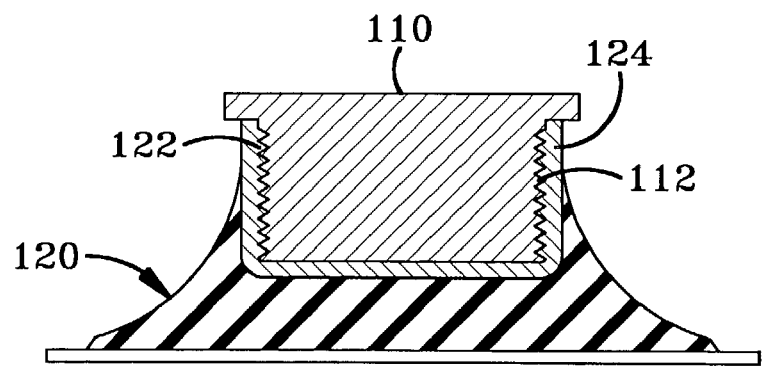
FIG. 8 is a third embodiment of the present invention showing a threaded tag assembly threaded into the cavity of the rubber patch housing.

In a third embodiment of the present invention, FIG. 8, a tag assembly of 110 including the components previously discussed, is formed with external threads 112 in the potting. Rubber patch assembly 120, also similar to rubber patches previously discussed, includes internal threads 122 formed in housing 124 which mate with the external threads 112 of tag assembly. Tag assembly 110 is assembled into rubber patch assembly 120 by simply screwing tag assembly 110 into housing 124. While this arrangement normally should be sufficient to lock tag assembly to rubber patch assembly, an optional locking pin or set screw may be added to the assembly to lock the internal and external threads in place and prevent tag assembly from backing out of the housing of rubber patch assembly 120.

From the foregoing, other embodiments should be obvious. For example, a slot and spline arrangement not shown may be used to lock the tag assembly into the housing. Mating slots and splines are formed in the potting of the tag assembly and in the housing. After placing the tag assembly into the housing, an optional locking device as previously discussed may be used to prevent the tag assembly from backing out of the housing.

Figure 9:
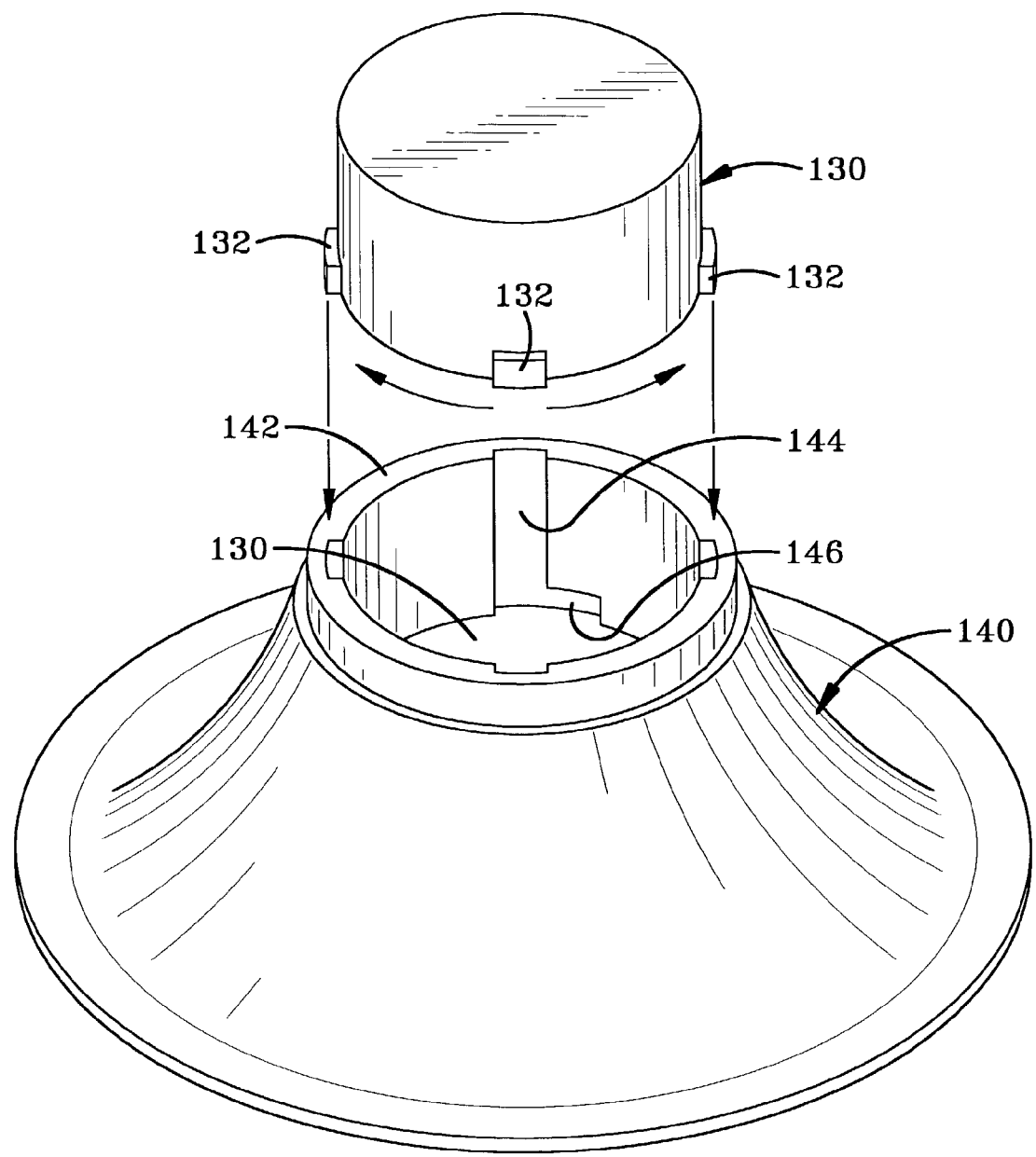
FIG. 9 is a fourth embodiment of the present invention, shown in perspective, showing a slot and tab arrangement for locking a tag assembly to a rubber patch housing.
Figure 10:
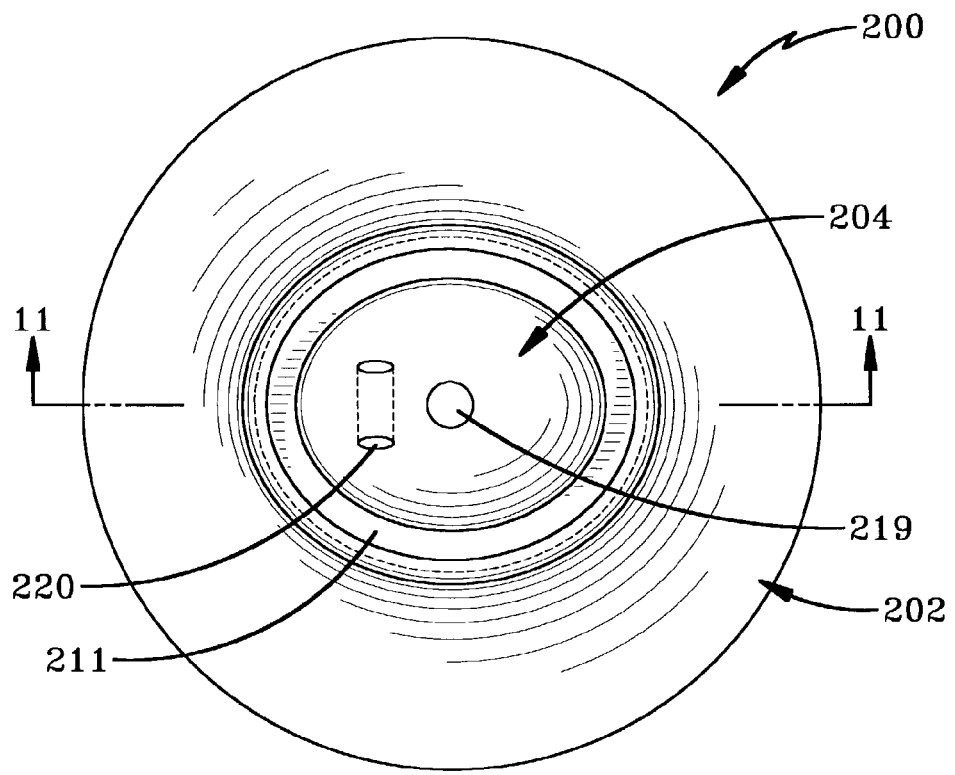
FIG. 10 is a top plan view of the fifth embodiment of the invention showing a tag assembly connected to a patch.

In yet another embodiment, depicted in FIG. 9, tag assembly 130 is formed with at least one tab 132, while housing 142 of rubber patch 140 is formed with slots 144 corresponding to tabs on tag assembly 130. At the bottom of the slots is a ring 146 having an internal diameter corresponding to the slot depth on the housing and extending from each slot at least partially around the housing bottom. Once tabs 132 of tag assembly 130 are mated with slots 144 of rubber patch and tag assembly 130 is inserted into housing 142, tag assembly 130 is rotated sufficiently so that tabs 132 are rotated into ring 146 and no longer are aligned with slots 144, locking the tag assembly to rubber patch 140. An optional locking mechanism, such as discussed previously, may be added to lock tag assembly 130 to rubber patch 140 if there is a concern about rotation of tag assembly 130 with respect to rubber patch assembly. Another method of locking tag assembly 130 to rubber patch 140 is to insert a piece of material (not shown) into at least one slot 144, for example by an interference fit between the slot and the material, so that in the event of rotation of the parts with respect to one another, even if the tabs 132 and slots become aligned, tabs 132 are prevented from moving axially in the slot. It is obvious that an equivalent structure can be achieved by reversing the arrangement of slots 144, ring 146 and tabs 132 between tab assembly 130 and housing 142. In this arrangement, at least one tab is formed in the housing and at least one slot corresponding to tabs is formed in tab assembly.

The fifth embodiment of the monitoring device (tag) and patch assembly of the invention is indicated generally by the numeral 200 in FIGS. 10–13. Assembly 200 generally includes a patch 202 and a monitoring device 204 that includes a protective body and a monitoring assembly. Patch 202 is generally configured to hold monitoring device 204 in a manner that allows monitoring device 204 to be repeatedly removed from patch 202 and reattached to patch 202 so that monitoring device 202 may be selectively mounted to tire 71 by selectively mounting monitoring device 204 to patch 202.

The fifth embodiment of monitoring device 204 has an outer surface that is rounded or curved in a manner that allows the body to roll as described in U.S. Pat. No. 6,082,192. The exemplary embodiments of the invention depict monitoring devices that are,free of flat surfaces. The exemplary embodiments in these drawings depict a sphere and an oblong sphere although other shapes are contemplated by the inventors. Other embodiments of monitoring device 204 may have outer surfaces that have substantially outer curved or rounded surfaces when the outer surfaces include a plurality of small flat surfaces that cooperate to define an, outer rounded surface. These types of monitoring devices are designed to be placed loosely within a tire such that they may roll around being bounded by only the tire and the rim. Monitoring device 204 may have the same structure as the monitoring device disclosed in U.S. Pat. No. 6,082,192; the disclosures of this patent are incorporated herein by reference. As such, monitoring device 204 and those having the same type of configuration (a rounded outer surface) do not have any features that may be used to secure them to a patch. Patch 202 of the present invention is designed to hold monitoring device 204 in a fixed position with respect to tire 71 without requiring any special modification to monitoring device 204 that would prevent monitoring device 204 from being used in a tire in a loose, free rolling configuration.

Patch 202 includes a base 206 and a tube section 208 that projects up from base 206. Patch 202 may include a bonding layer 20 as described above. Tube section 208 is annular and continuous and defines a cavity 210. Tube section 208 includes a continuous lip 211 that defines an opening 212 that provides access to cavity 210. Lip 211 and tube section 208 are free of interruptions, such as slits, that would allow lip 211 and tube section 208 to unintentionally open when used with the rounded monitoring devices of the invention. The continuity of lip 211 increases the retaining ability of patch 202 which is important when holding a spherical, oblong sphere, or teardrop shaped monitoring device. The continuity of lip 211 also reduces the risk that lip 211 will tear during extended use. Tube section 208 tapers closed toward lip 211.

Figure 11:
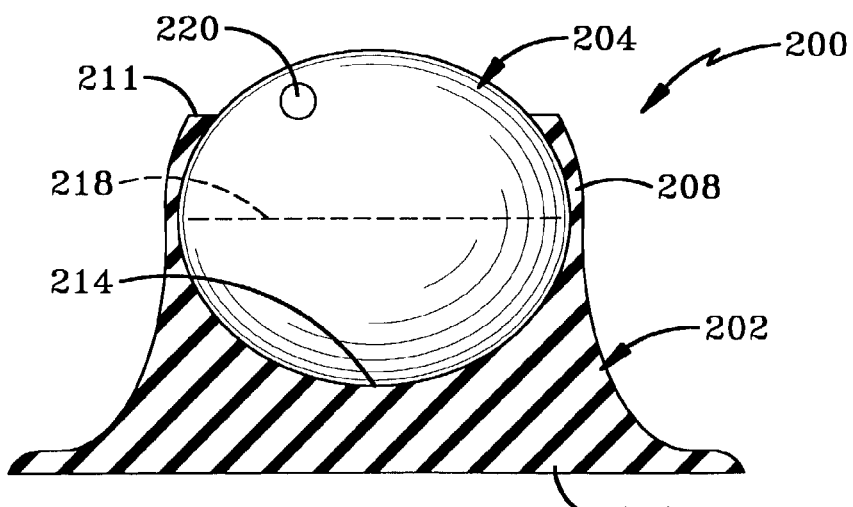
FIG. 11 is a section view of the patch taken along line 11—11 of FIG. 10 showing the patch in section with the tag assembly in elevation.

The resting position of lip 211 and opening 212 is smaller than the maximum width of monitoring device 204 such that opening 212 must be stretched wider to allow monitoring device 204 to be inserted into and removed from cavity 210. Lip 211 thus has a closed resting position and an open stretched position. Cavity 210 has a depth that is greater than half of the height of monitoring device 204 such that tube section 208 will close around monitoring device 204 to hold it in place. The walls of tube section 208 have sufficient elasticity and extensibility such that opening 212 may be stretched open to accommodate monitoring device 204 to seat monitoring device 204 within patch 202 as depicted in FIG. 11. The elasticity of the walls allows them to return to their resting position to trap monitoring device 204 with an interference fit within patch 202. The material of patch 202 is configured to retain these properties overtime in both hot and cold operating conditions. In exemplary embodiments, patch 202 may be fabricated from any of a variety of thermosets or thermoplastics that have desirable resiliency and aged properties.

Opening 212 may be centered about the longitudinal axis of patch 202 such that opening 212 is directed toward the center of tire 71 when patch 202 is mounted to tire 71. Centrifugal forces will thus force monitoring device 204 against patch 202.

The inner surface 214 that defines cavity 210 may be curved to substantially match the outer curvature of monitoring device 204 as shown in FIG. 11. In other embodiments of the invention, the inner surface 214 may be configured such that an air pocket is disposed between base 206 and monitoring device 204.

In the embodiment of the invention depicted in FIG. 11, monitoring device 204 is oblong and is positioned with its largest diameter substantially perpendicular to the longitudinal axis of patch 202. Device 204 may be 3 to 5 percent out of round to achieve the benefits of an oblong device. The inventors also contemplate that patch 202 may be configured to receive monitoring device 204 with the smallest diameter of monitoring device 204 substantially perpendicular to the longitudinal axis of patch 202. An oblong configuration helps properly align monitoring device 204 within patch 202 when vibration forces move monitoring device 204 with respect to patch 202.

A predictable proper alignment is important when monitoring device 204 has an antenna 218 that is tuned to function better when positioned in a specific direction. For example, antenna 218 may be aligned with the longest dimension of monitoring device 204 so that the user will known the orientation and can orient antenna 218 with respect to tire 71.

The proper alignment of monitoring device 204 is also important so that the breathing tube 219 for the pressure sensor remains positioned within opening 212.

Figure 12:
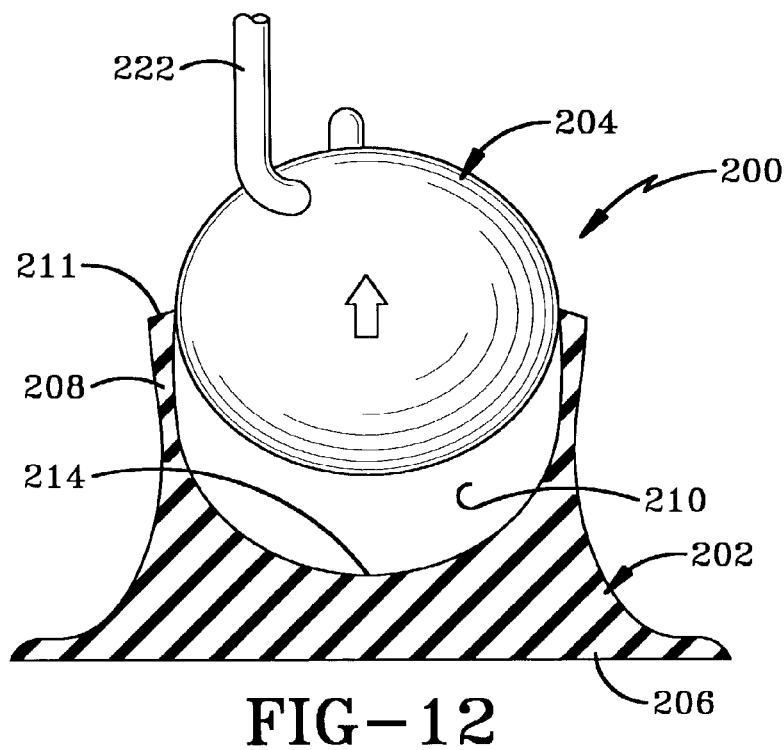
FIG. 12 is a view similar to FIG. 11 showing the tag assembly being removed from the patch.
Figure 13:
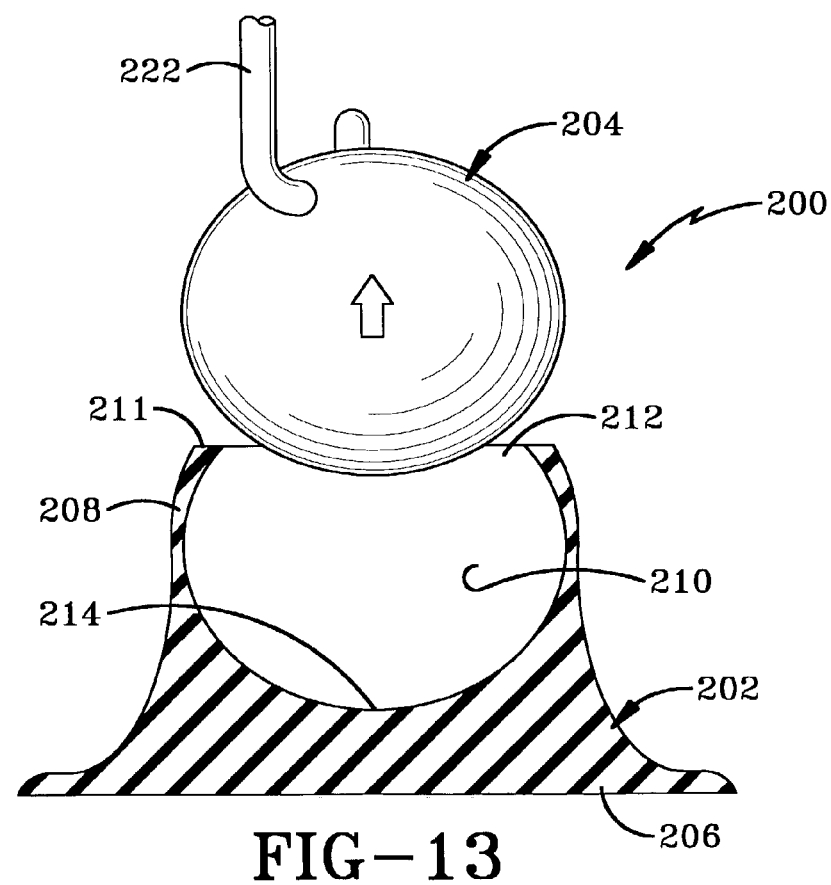
FIG. 13 is a view similar to FIG. 11 showing the tag assembly and patch immediately after the tag assembly has been removed from the patch.
Figure 14:
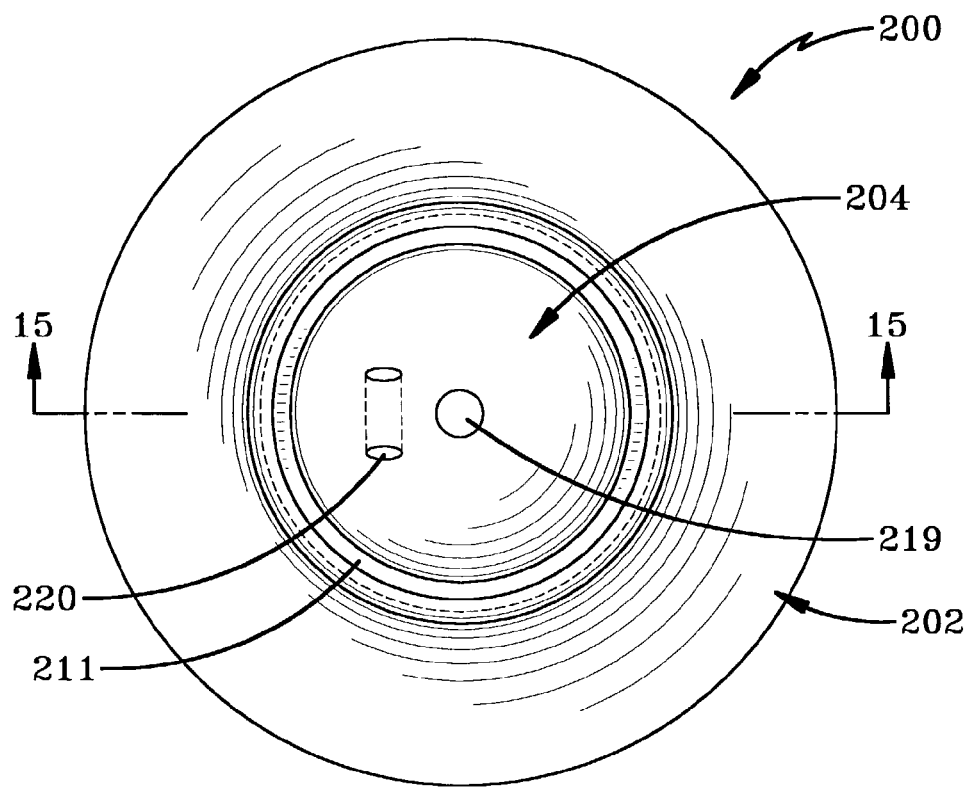
FIG. 14 is a top plan view of the sixth embodiment of the invention showing a tag assembly connected to a patch.
Figure 15:
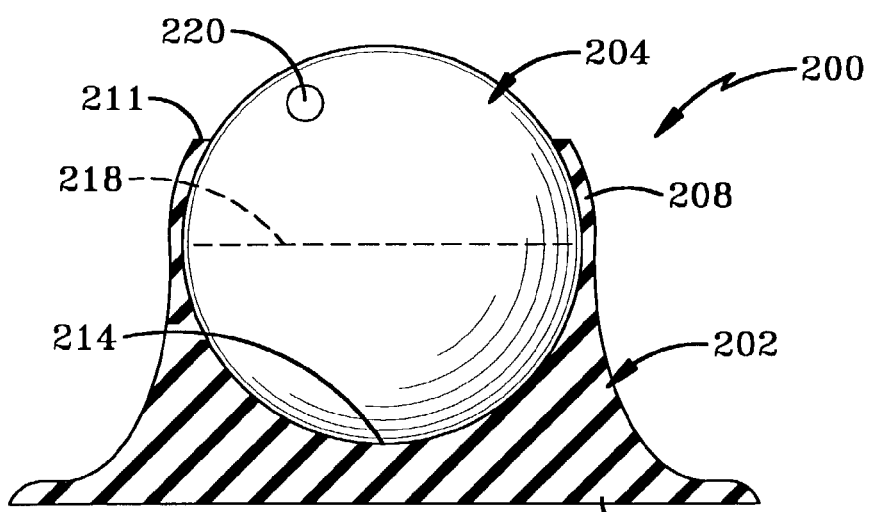
FIG. 15 is a section view of the patch taken along line 15—15 of FIG. 14 showing the patch in section with the tag assembly in elevation.

The proper alignment is also important when monitoring device 204 has a retraction opening 220 that allows a tool or retraction device 222 to engage monitoring device 204 and pull it from patch 202 as shown in FIGS. 12 and 13. Opening 220 allows at least a portion of device 222 to be inserted into the body of device 204 such that device 204 may be pulled from patch 202. FIGS. 14 and 15 depict a sixth embodiment wherein monitoring device 204 is spherical. Another method of removing monitoring device 204 from patch 202 is to squeeze tube section 208 adjacent base 206 to force monitoring device 204 out of patch 202. The squeezing force may be used in conjunction with tool 222.

Patch 202 has rounded and curved walls and surfaces that lack points where stresses are concentrated. The lack of stress concentration increases the durability of patch 202. Tube section 208 may also be configured to absorb vibrational forces. Assembly 200 also has the advantage that monitoring device 204 will not harm tire 71 if monitoring device 204 falls out of patch 202 because monitoring device is designed to be used loosely within tire 71 and includes no sharp edges that could damage tire 71.

Figure 17:
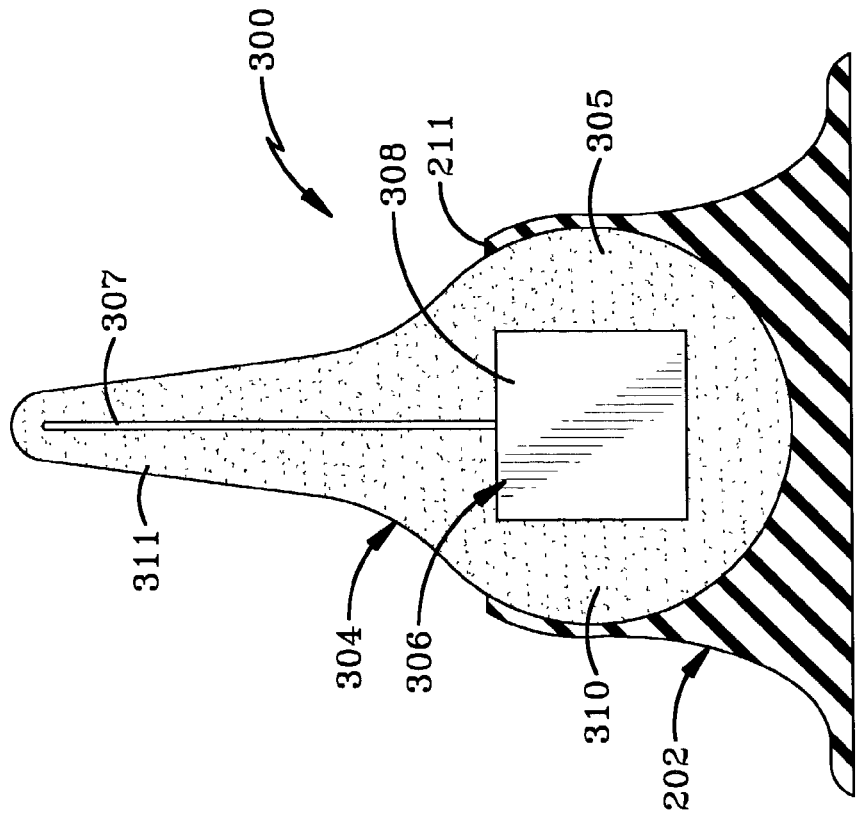
FIG. 17 is a section view taken through the patch and monitoring device of FIG. 16.

The seventh embodiment of the monitoring device (tag) and patch assembly of the invention is indicated generally by the numeral 300 in FIGS. 16–17. Assembly 300 generally includes patch 202 and an encapsulated monitoring device 304 having a protective body 305 and a monitoring assembly 306. Monitoring assembly 306 includes an antenna 307 and the components 308 that are necessary to monitor and transmit the conditions of the tire.

As described above, patch 202 is generally configured to hold monitoring device 304 in a manner that allows monitoring device 304 to be repeatedly removed from patch 202 and reattached to patch 202 so that monitoring device 202 may be selectively mounted to tire 71 by selectively mounting monitoring device 304 to patch 202. In the seventh embodiment of invention, monitoring device 304 is teardrop shaped with the rounded head 310 of the teardrop being held by patch 202 in the manner described above. The tapered tail portion 311 of monitoring device 304 extends out of patch 202 into the interior of tire 71.

Antenna 307 of the monitoring system may be positioned in tail portion 311 with components 308 being disposed in head 310. Antenna 307 is parallel to the longitudinal axis of patch 202. Antenna 307 is thus disposed substantially perpendicular to the surface of patch 202 that engages tire 71. This configuration allows antenna 307 to be disposed radially with respect to tire 71 when patch 202 is attached to the crown portion of tire 71 as depicted in FIG. 16.

Figure 18:
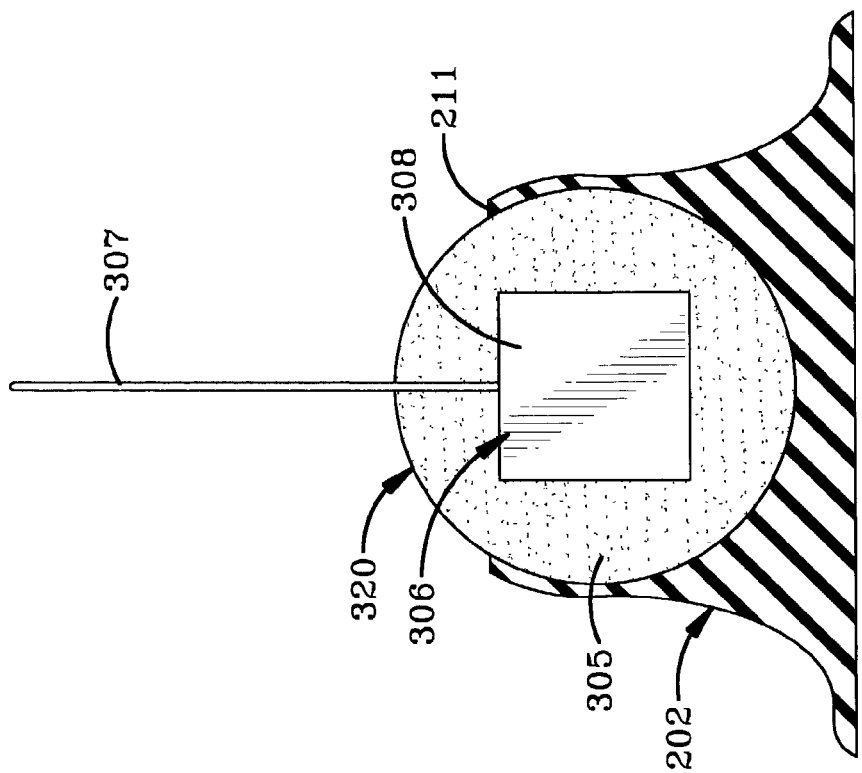
FIG. 18 is a section view similar to FIG. 17 showing an eighth embodiment of the invention wherein the entire length of the antenna is not encapsulated.

FIG. 18 depicts an eighth embodiment of the invention wherein the monitoring device 320 has a freely extending antenna 307. Antenna 307 extends straight from patch 202 as described above.

Figure 19:
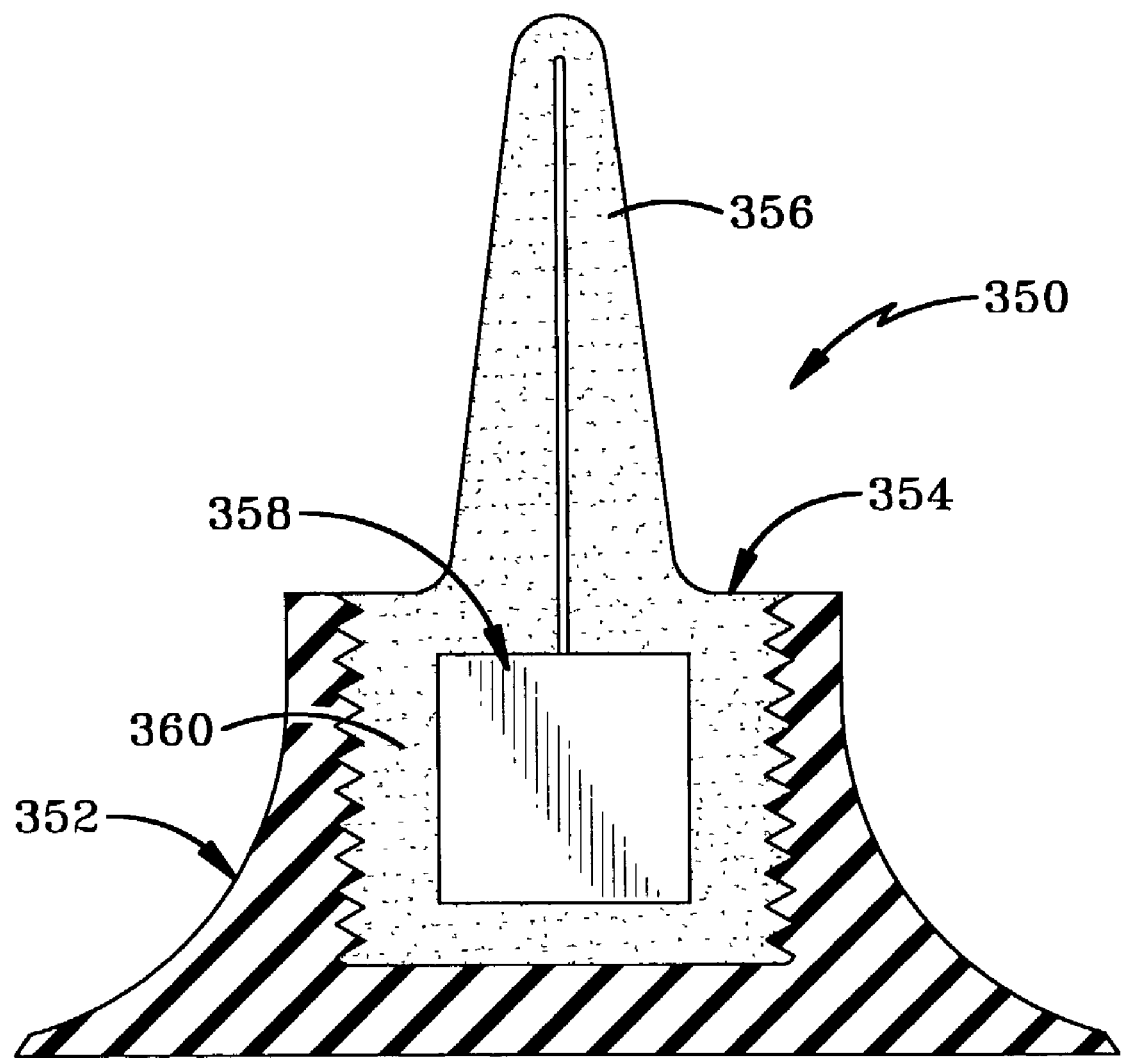
FIG. 19 is a section view similar to FIG. 17 showing a ninth embodiment of the invention wherein the encapsulated monitoring device is threaded to the patch.

The ninth embodiment of the assembly is indicated generally by the numeral 350 in FIG. 19. Assembly 350 includes a patch 352 and a monitoring device 354 that includes a protective body 356 and a monitoring assembly 358. Ninth embodiment 350 is also teardrop shaped but the head 360 of the teardrop is threaded to cooperate with threads defined by patch 352 to hold device 354 in place.

Figure 20:
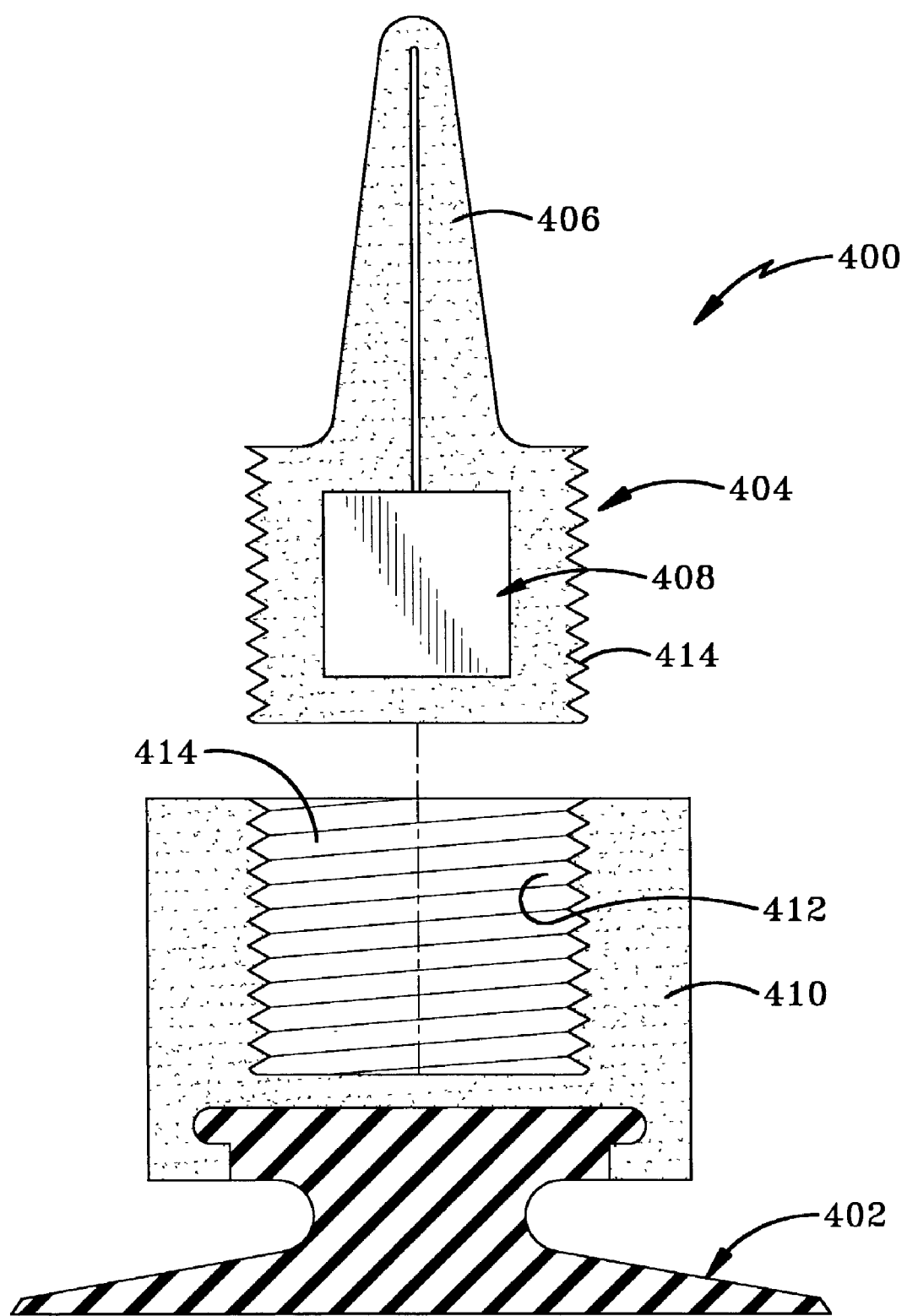
FIG. 20 is a section view showing a tenth embodiment of the invention wherein an encapsulated monitoring device is threaded into a housing that is encapsulated around a portion of the patch.

The tenth embodiment of the assembly is indicated generally by the numeral 400 in FIG. 20. Assembly 400 includes a patch 402 and a monitoring device 404 that includes a protective body 406 and a monitoring assembly 408. Monitoring device 404 is the same as monitoring device 354 described above. In the tenth embodiment, monitoring device 404 is not directly connected to patch 402. In this embodiment, assembly 400 includes an intermediate housing 410 that is attached to patch 402. Monitoring device 404 is connected to housing 410 when it is mounted.

Housing 410 may be fabricated from the same material as protective body 406 or another material more rigid than the material of patch 402. In one embodiment of the invention, housing 410 is encapsulated around the upper portion of patch 402. In other embodiments, housing 410 may be adhesively connected or mechanically connected to patch 402.

Housing 410 defines a cavity 412 adapted to receive all of, or a portion of, monitoring device 404. Housing 410 and monitoring device 404 define cooperating threads 414 that allow monitoring device 404 to be selectively attached to and removed from housing 410. In addition to threads 414, any of the other attachment arrangements described above may be used without departing from the concepts of the invention.

While in accordance with the patent statutes, the best mode and preferred embodiment has been set forth above, the scope of the invention is not limited thereto, but rather by the scope of the attached claims.

What is claimed is:

1. A tire monitoring device and patch assembly for mounting the monitoring device in a tire; the assembly comprising: a patch adapted to be connected to the tire; the patch having a base and an elongated, resilient tube section projecting from the base; the base and tube section defining a cavity having a longitudinal axis disposed substantially perpendicular to the base; an electronic monitoring device having a body; at least a portion of the body being substantially spherical; the substantially spherical portion of the electronic monitoring device being disposed in the cavity; the tube section defining an opening to the cavity; the opening having a resting position that has a resting size; the body of the electronic monitoring device having a maximum width dimension; and the resting size of the opening to the cavity being smaller than the maximum width dimension of the electronic monitoring device.

2. The assembly of claim 1, wherein the tube section has a continuous sidewall that terminates in a lip; the lip defining an opening to the cavity defined by the patch.

3. The assembly of claim 2, wherein a portion of the electronic monitoring device extends out of the opening defined by the lip.

4. The assembly of claim 1, wherein the body of the monitoring device defines a retraction opening; the retraction opening being disposed outside of the cavity defined by the base and tube section.

5. The assembly of claim 1, further comprising a layer of bonding material attached to the body of the patch.

6. The assembly of claim 1, wherein more than half of the body of the monitoring device is disposed within the cavity.

7. The assembly of claim 1, wherein the body of the monitoring device defines a breathing tube having an opening; the opening of the breathing tube being positioned outside the cavity of the patch.

8. The assembly of claim 1, wherein the body of the monitoring device is an oblong sphere.

9. The assembly of claim 1, wherein the electronic monitoring device includes an antenna; the antenna being disposed substantially perpendicular to the base.

10. The assembly of claim 9, wherein the body of the electronic monitoring device surrounds the antenna.

11. The assembly of claim 10, wherein the body of the electronic monitoring device is teardrop shaped.

12. A tire monitoring device and patch assembly for mounting the monitoring device in a tire; the assembly comprising: a patch adapted to be connected to the tire, the patch having a resilient tube section; an electronic monitoring device having a body; the body being substantially spherical; the electronic monitoring device being selectively resiliently held by the resilient tube section of the patch; and the body of the electronic monitoring device defining a retraction opening; the retraction opening being adapted to allow a retraction device to be inserted into the body of the electronic monitoring device such that the electronic monitoring device may be pulled from the patch with the retraction device.

13. A tire monitoring device and patch assembly for mounting the monitoring device in a tire; the assembly comprising: a patch adapted to be connected to the tire, an electronic monitoring device having a body; the body being substantially spherical; the electronic monitoring device being selectively connected to the patch;

the body of the electronic monitoring device defining a retraction opening; the retraction opening being adapted to allow a retraction device to be inserted into the body of the electronic monitoring device such that the electronic monitoring device may be pulled from the patch with the retraction device; and the retraction opening passes through the body of the electronic monitoring device.

14. A tire monitoring device and patch assembly for mounting the monitoring device in a tire; the assembly comprising: a patch adapted to be connected to the tire; an electronic monitoring device having a body; the body being teardrop shaped; the teardrop shaped body having a head portion and a tail portion; the head portion being wider than the tail portion; the head portion being connected to the patch; and the tail portion extending from the patch.

15. The assembly of claim 14, wherein the head portion of the body is threaded to the patch.

16. The assembly of claim 14, wherein the teardrop shaped body is removably and replaceably connected to the patch.

* * * * *